(12) United States Patent
Beckhart (10) Patent No.: US 12,214,954 B1
(45) Date of Patent: Feb. 4, 2025

(54) CORD OR ROPE STORAGE BAG FOR PREVENTING KNOTS AND A METHOD USING THE SAME

(71) Applicant: Gordon Haggott Beckhart, Colorado Springs, CO (US)

(72) Inventor: Gordon Haggott Beckhart, Colorado Springs, CO (US)

(*) Notice: Subject to any disclaimer, the term of this patent is extended or adjusted under 35 U.S.C. 154(b) by 88 days.

(21) Appl. No.: 18/095,598

(22) Filed: Jan. 11, 2023

Related U.S. Application Data (60) Provisional application No. 63/299,395, filed on Jan. 13, 2022.

(51) Int. Cl.
| | | |
|---|---|---|
| *B65D 85/08* | (2006.01) | |
| *B65D 33/06* | (2006.01) | |
| *B65D 33/25* | (2006.01) | |

(52) U.S. Cl.
CPC .......... *B65D 85/08* (2013.01); *B65D 33/065* (2013.01); *B65D 33/25* (2013.01)

(58) Field of Classification Search
CPC ....... B65D 85/08; B65D 33/065; B65D 33/25
USPC ....................................................... 383/127
See application file for complete search history.

(56) References Cited

U.S. PATENT DOCUMENTS

| | | | |
|---|---|---|---|
| 5,103,977 A | 4/1992 | Douglas | |
| 5,439,109 A * | 8/1995 | McBride | A45C 7/0077 383/111 |
| 5,586,655 A * | 12/1996 | McBride | A45C 7/0077 383/111 |
| 6,026,962 A | 2/2000 | Witt et al. | |
| 6,267,244 B1 * | 7/2001 | Witt | H02G 11/02 383/33 |
| 6,478,157 B1 * | 11/2002 | Witt | H02G 11/02 383/33 |
| 6,968,955 B2 | 11/2005 | Steeber | |
| 7,080,606 B1 * | 7/2006 | Harrison | B63B 21/04 242/404 |
| 8,789,696 B2 | 7/2014 | Imburgia et al. | |
| 9,499,372 B1 * | 11/2016 | Shield | B65H 75/362 |
| 10,396,515 B2 * | 8/2019 | Nauertz | H02J 7/0042 |
| 10,662,024 B2 | 5/2020 | Kirkham | |
| 10,750,836 B2 | 8/2020 | Caroli | |
| 10,912,362 B2 * | 2/2021 | Nauertz | A45C 3/00 |

(Continued)

FOREIGN PATENT DOCUMENTS

CN          111776895 A * 10/2020 ......... B65H 75/4465

*Primary Examiner* — Jes F Pascua
(74) *Attorney, Agent, or Firm* — The Law Office of Patrick F. O'Reilly III, LLC (57) ABSTRACT

A cord or rope storage bag for preventing knots is disclosed herein. The cord or rope storage bag includes a bag body portion, the bag body portion defining an interior compartment configured to store a cord or rope therein; a first cord or rope end retention device, the first cord or rope end retention device configured to be coupled to a first end of the cord or rope; and a second cord or rope end retention device, the second cord or rope end retention device configured to be coupled to a second end of the cord or rope. An attachment of the first and second ends of the cord or rope to the respective first and second cord or rope end retention devices is configured to prevent a formation of knots in the cord or rope being stored in the interior compartment of the cord or rope storage bag.

15 Claims, 6 Drawing Sheets

(56) References Cited

U.S. PATENT DOCUMENTS

2010/0231161 A1    9/2010   Brown
2015/0101958 A1    4/2015   Cross

* cited by examiner

CORD OR ROPE STORAGE BAG FOR PREVENTING KNOTS AND A METHOD USING THE SAME

CROSS-REFERENCE TO RELATED APPLICATIONS

This patent application claims priority to, and incorporates by reference in its entirety, U.S. Provisional Patent Application No. 63/299,395 entitled "Cord Or Rope Storage Bag For Preventing Knots", filed on Jan. 13, 2022.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a cord or rope storage bag for preventing knots and a method using the same. More particularly, the invention relates to a cord or rope storage bag and a method using the same that prevents a formation of knots in a cord or rope being stored in an interior compartment of the storage bag.

2. Background

Extension cords, Christmas light strings, and similar long electrical wires have a seemingly magical ability to form knots while in storage. Untying these knotted cords is a never-ending source of frustration. Similar issues exist for ropes.

There are many devices designed to wind up, roll up, or otherwise carefully and tediously wrap these cords for storage to prevent knots. These solutions work to varying degrees but take additional time and careful attention to use properly. These solutions are often not self-contained so the cord or lights can get dirty, degraded by sunlight if left outside, or damaged if an outer wire insulating cover gets nicked. These solutions often require the entire cord to be unwound before being able to test or use the cord. There are combination kits that include a manual wind-up device and a separate outer bag to prevent the environmental or mechanical damage issues.

What is needed is a simple system that keeps these extension cords, holiday light strings, and ropes from knotting, keeps them safe from damage, keeps them clean, makes it easy to test and/or use without completely unwinding, and takes minimal time to contain and store the cord, rope, or lights.

BRIEF SUMMARY OF EMBODIMENTS OF THE INVENTION

Accordingly, the present invention is directed to a cord or rope storage bag for preventing knots and a method using the same that substantially obviates one or more problems resulting from the limitations and deficiencies of the related art.

In accordance with one or more embodiments of the present invention, there is provided an electrical cord storage bag for preventing cord knots that includes a bag body portion, the bag body portion defining an interior compartment configured to store an electrical cord therein; a first cord end retention device, the first cord end retention device configured to be coupled to a first end of the electrical cord; and a second cord end retention device, the second cord end retention device configured to be coupled to a second end of the electrical cord. In these one or more embodiments, an attachment of the first and second ends of the electrical cord to the respective first and second cord end retention devices is configured to prevent a formation of knots in the electrical cord being stored in the interior compartment of the electrical cord storage bag.

In a further embodiment of the present invention, the electrical cord storage bag further comprises a closure mechanism for closing the interior compartment of the bag body portion so as to protect the electrical cord during storage and/or transport.

In yet a further embodiment, the closure mechanism is selected from a group consisting of: (i) a zipper, (ii) one or more snaps, (iii) one or more buttons, (iv) a tie, (v) a flap, (vi) a hook and loop fastener device, (vii) a magnetic closure, and (viii) combinations thereof.

In still a further embodiment, the electrical cord storage bag further comprises one or more handles attached to the bag body portion for facilitating the carrying of the electrical cord storage bag by a user thereof.

In yet a further embodiment, the bag body portion is selected from a group consisting of: (i) a soft-sided bag, (ii) a fabric bag. (iii) a canvas bag, (iv) a nylon bag, (v) a leather bag, (vi) a paper bag, (vii) a plastic bag. (viii) a bag with a hard bottom, (ix) a compressible bag, and (x) a rubber bag.

In still a further embodiment, the first and second cord end retention devices are selected from a group consisting of: (i) a male dummy plug, (ii) a female dummy plug, (iii) an active electrical plug or receptacle, (iv) a combination male two-prong or three-prong plug, (v) a female two-prong or three-prong receptacle, (vi) a snap-in holder to grab the first and second ends of the electrical cord, (vii) a pocket that captures the first and second ends of the electrical cord, (viii) a cinch cord to hold the first and second ends of the electrical cord, (ix) a string to hold the first and second ends of the electrical cord, (x) a rubber band to hold the first and second ends of the electrical cord, and (xi) combinations thereof.

In yet a further embodiment, the electrical cord that is configured to be stored in the bag body portion is selected from a group consisting of: (i) an electrical extension cord or cable, (ii) electrical wiring of decorative string lights, (iii) a power extender cord or cable, (iv) a drop cord, (v) a power strip, (vi) an electronic cable, (vii) an extension cable, (viii) a phone cable, (ix) a coaxial cable, (x) a speaker cable, (xi) a guitar cable, (xii) a stereo cable, (xiii) an instrument cable, and (xiv) a cable.

In still a further embodiment, the first cord end retention device is in a form of a female dummy socket, and the first end of the electrical cord comprises a male plug configured to be inserted into the female dummy socket.

In yet a further embodiment, the second cord end retention device is in a form of a male dummy plug, and the second end of the electrical cord comprises a female socket configured to receive the male dummy plug.

In still a further embodiment, the second end of the electrical cord comprises a female socket; and the electrical cord storage bag further comprises an active electrical adapter provided in the bag body portion, the active electrical adapter comprising a male plug end configured to be inserted into the female socket of the electrical cord and one or more female receptacles that are disposed in a wall of the bag body portion, thereby enabling the electrical cord storage bag to operate as a self-contained power strip where a necessary amount of wire is able to be removed from the bag body portion to reach an electrical receptacle.

In yet a further embodiment, the electrical cord storage bag further comprises a closure mechanism for closing the interior compartment of the bag body portion so as to protect the electrical cord during storage and/or transport; the closure mechanism is a dual operation zipper mechanism comprising one or more zippers configured to open both ends of the bag body portion proximate to respective ones of the first and second cord end retention devices, while keeping the bag body portion closed in the middle part thereof; and the dual operation zipper mechanism enables the first end or the second end of the electrical cord to be removed from the respective first cord end retention device or second cord end retention device and pulled from the bag, while keeping a remaining portion of the electrical cord stowed in the interior compartment of the bag body portion.

In accordance with one or more other embodiments of the present invention, there is provided a method of storing an electrical cord in a bag to prevent knotting of the cord. The method comprises the steps of: (i) starting with an electrical cord in an unknotted condition; (ii) providing an electrical cord storage bag for preventing cord knots, the electrical cord storage bag including a bag body portion, the bag body portion defining an interior compartment configured to store the electrical cord therein; a first cord end retention device, the first cord end retention device configured to be coupled to a first end of the electrical cord; and a second cord end retention device, the second cord end retention device configured to be coupled to a second end of the electrical cord; (iii) connecting the first end of the electrical cord with the first cord end retention device of the electrical cord storage bag; (iv) connecting the second end of the electrical cord with the second cord end retention device of the electrical cord storage bag; (v) gathering up the electrical cord without creating any knots in the electrical cord; and (vi) placing the gathered-up electrical cord in the interior compartment of the electrical cord storage bag while the first and second ends of the electrical cord remain attached to the respective first and second cord end retention devices so as to prevent a formation of knots in the electrical cord being stored in the interior compartment of the electrical cord storage bag.

In a further embodiment of the present invention, the first cord end retention device is in a form of a female dummy socket, and the first end of the electrical cord comprises a male plug configured to be inserted into the female dummy socket.

In yet a further embodiment, the second cord end retention device is in a form of a male dummy plug, and the second end of the electrical cord comprises a female socket configured to receive the male dummy plug.

In still a further embodiment, the method further comprising the steps of: (vii) when utilizing the electrical cord, removing the electrical cord from the interior compartment of the electrical cord storage bag while the first and second ends of the electrical cord remain attached to the respective first and second cord end retention devices; (viii) disconnecting the second end of the electrical cord from the second cord end retention device of the electrical cord storage bag; and (ix) plugging the second end of the electrical cord into an electrical power receptacle.

In yet a further embodiment, the method further comprises the steps of: (vii) when utilizing the electrical cord, disconnecting the second end of the electrical cord from the second cord end retention device of the electrical cord storage bag; (viii) plugging the second end of the electrical cord into an electrical power receptacle; (ix) removing a desired length of the electrical cord from electrical cord storage bag to reach a particular area where electrical power from the electrical cord is needed; (x) disconnecting the first end of the electrical cord from the first cord end retention device of the electrical cord storage bag; and (xi) connecting the first end of the electrical cord to a power cord of a device requiring the electrical power.

In accordance with yet one or more other embodiments of the present invention, there is provided a cord or rope storage bag for preventing knots that includes a bag body portion, the bag body portion defining an interior compartment configured to store a cord or rope therein; a first cord or rope end retention device, the first cord or rope end retention device configured to be coupled to a first end of the cord or rope; and a second cord or rope end retention device, the second cord or rope end retention device configured to be coupled to a second end of the cord or rope. In these one or more embodiments, an attachment of the first and second ends of the cord or rope to the respective first and second cord or rope end retention devices is configured to prevent a formation of knots in the cord or rope being stored in the interior compartment of the cord or rope storage bag.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Described in one or more embodiments herein is a novel soft-sided bag with dummy plugs to capture the ends of a cord and prevent any knots, while fully enclosing the cord to protect it. The bag can have a zipper or other closure to fully protect the cord for storage and transport. The bag can have handles that allow for easy handling, hanging, transporting, and storage. This novel bag simplifies the gathering and storing of an extension cord or string of lights without the risk of knotting. The bag eliminates the tedious time-consuming careful winding of a cord onto itself or onto one of many winding devices available.

In one or more embodiments, this bag has a male plug and female receptacle to contain both ends of the extension cord or string of lights. These plug ends can be dummy plugs with no electrical wiring. Once both ends of an extension cord or string of lights are plugged in, the cord will not knot. The balance of the cord can simply be gathered together with minimal care and placed into the bag. As long as the cord was not knotted to start with, then the cord will emerge unknotted.

An added benefit for extension cords is the fact that a user does not have to unwind the full length of an extension cord to get use from the extension cord. The user can simply unplug the male end of the extension cord from the dummy receptacle in the bag, plug this end into the live receptacle, and back away removing cord from the bag until the user reaches the desired length. At which point the user can put the bag down, unplug the female end of the extension cord from the dummy plug and use the extension, with extra length of cord still gathered up in the bag.

The bag described herein is not a fixed dimension hard-shell container that requires a predetermined amount of space regardless whether it is full, empty, or is storing a smaller cord. The bag does not have extra internal winding elements that complicate the manufacture of the bag, complicate the use of the bag, and increase the expense of the bag. The bag does not have a center feature for winding the cord around. The bag does not require the tedious and careful winding or placement of a cord that most devices do.

In accordance with the devices of the present application, a bag (herein referred to as "bag") may include but is not limited to a soft-sided bag with handles, a bag with no handles, a container with one or more openings, a fabric bag, a canvas bag, a nylon bag, a leather bag, a paper bag, a plastic bag, a bag with a hard bottom, a compressible bag, and a rubber bag.

In accordance with the devices of the present application, a plug (herein referred to as "plug") may include but is not limited to a male dummy plug, a female dummy plug, a non-active electrical plug, an active electrical plug, a rubber simulated male or female plug, a plastic male or female plug, a combination material male 2 or 3 prong plug or female 2 or 3 prong receptacles, or a snap in holder to grab the cord ends, or a pocket that captures the cord ends, or a cinch cord to hold the cord ends, the ends of a cord, the ends of a light string, or a cinch, string, or rubber bands.

In accordance with the devices of the present application, a cord (herein referred to as "cord") may include but is not limited to an extension cord, a string of Christmas lights, a string of lights, power extender, drop cord, string lights, rope lights, extension lead, extension cable, power strip, a USB or other electronic cable, an extension cable, a phone cable, a coaxial cable, a rope, a string, a length of yarn, or any flexible linear device with plugs at each of the two ends.

In accordance with the devices of the present application, a zipper (herein referred to as "zipper") may include but is not limited to a snap or snaps, a button or buttons, a tie, a flap, a Velcro strip, magnetic closure, or any other available bag closure mechanisms.

In one example embodiment shown in FIGS. 1, 3, 4, and 5, the bag 1 has a zipper 5 or other closure mechanism, handles 4, a bag exterior 3 and a bag interior 2. A female dummy plug 7 and a male dummy plug 6 are connected to the bag interior 2, but can both extend beyond to the zipper 5 to make it easier to plug in cord male plug 9 and cord female plug 10 of extension cord 8 or of string of lights 13. Both female dummy plug 7 and a male dummy plug 6 once connected to cord 8 or to string of lights 13 can be retracted back into bag 1 below zipper 5 with entire length of cord 8 or string of lights 13. The zipper 5 can be closed to contain all of the cord 8 or string of lights 13.

Figure 1:
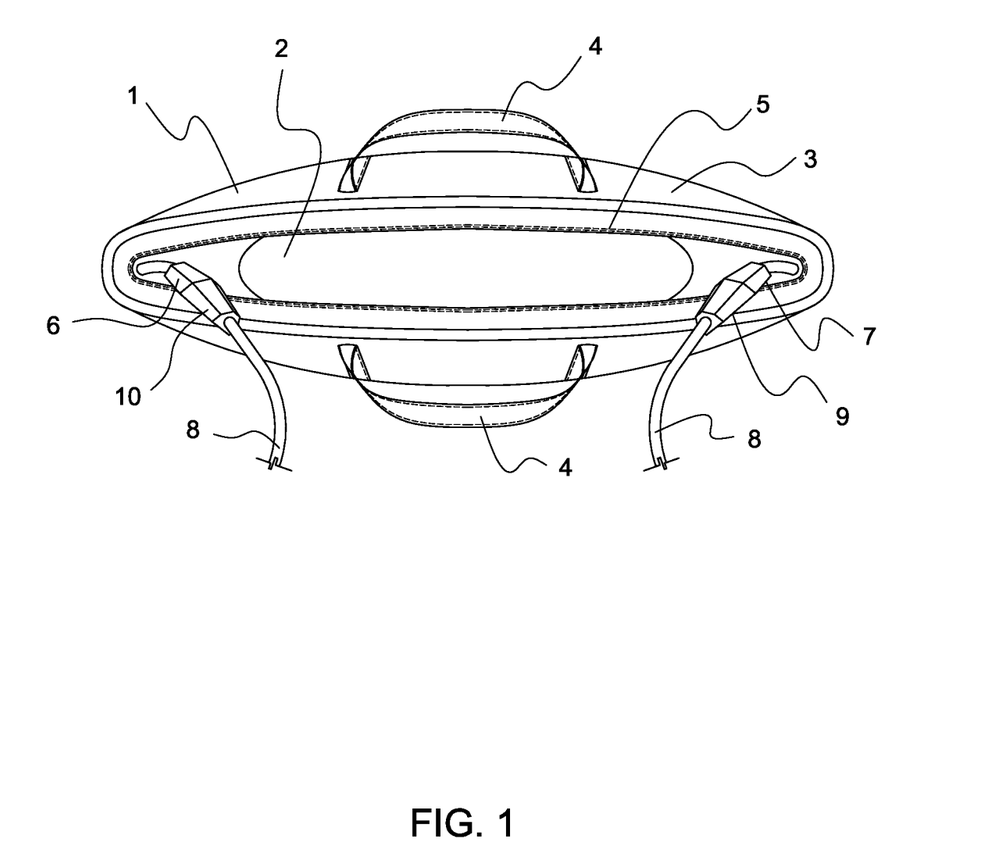
FIG. 1 is a top view of a storage bag for preventing knots, according to an example embodiment of the invention, wherein an extension cord is shown connected to the male and female dummy plugs of the storage bag.

FIG. 1 is a top view of the bag 1 in accordance with this example embodiment of the invention. The bag 1 has a bag interior 2 and a bag exterior 3. Bag 1 also has handles 4 and a zipper 5. Extension cord 8 is connected to the bag by extension cord male plug 9 plugging into female dummy plug 7, and extension cord female plug 10 plugging with male dummy plug 6.

Figure 3:
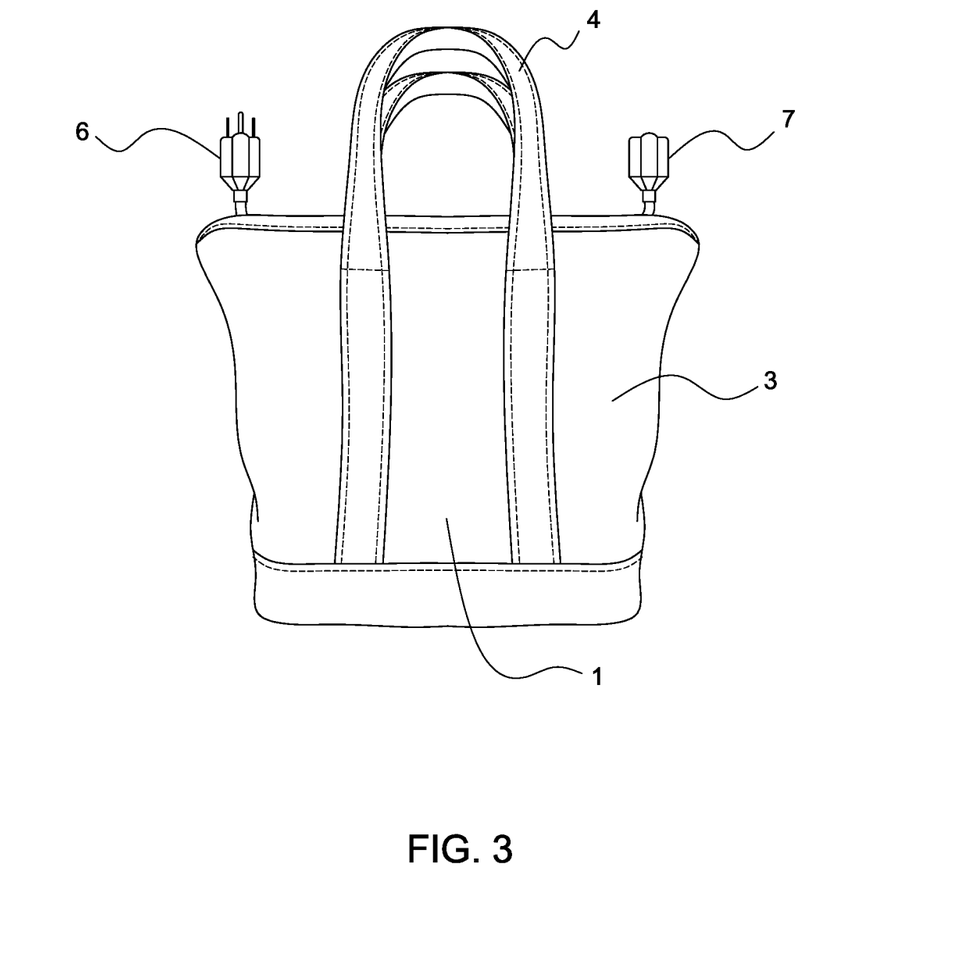
FIG. 3 is a side view of the storage bag of FIG. 1.

FIG. 3 is a side view of bag 1 in accordance with this example embodiment of the invention, with bag exterior 3 and handle 4. Male dummy plug 6 and female dummy plug 7 are connected to the inside of bag 1.

Figure 4:
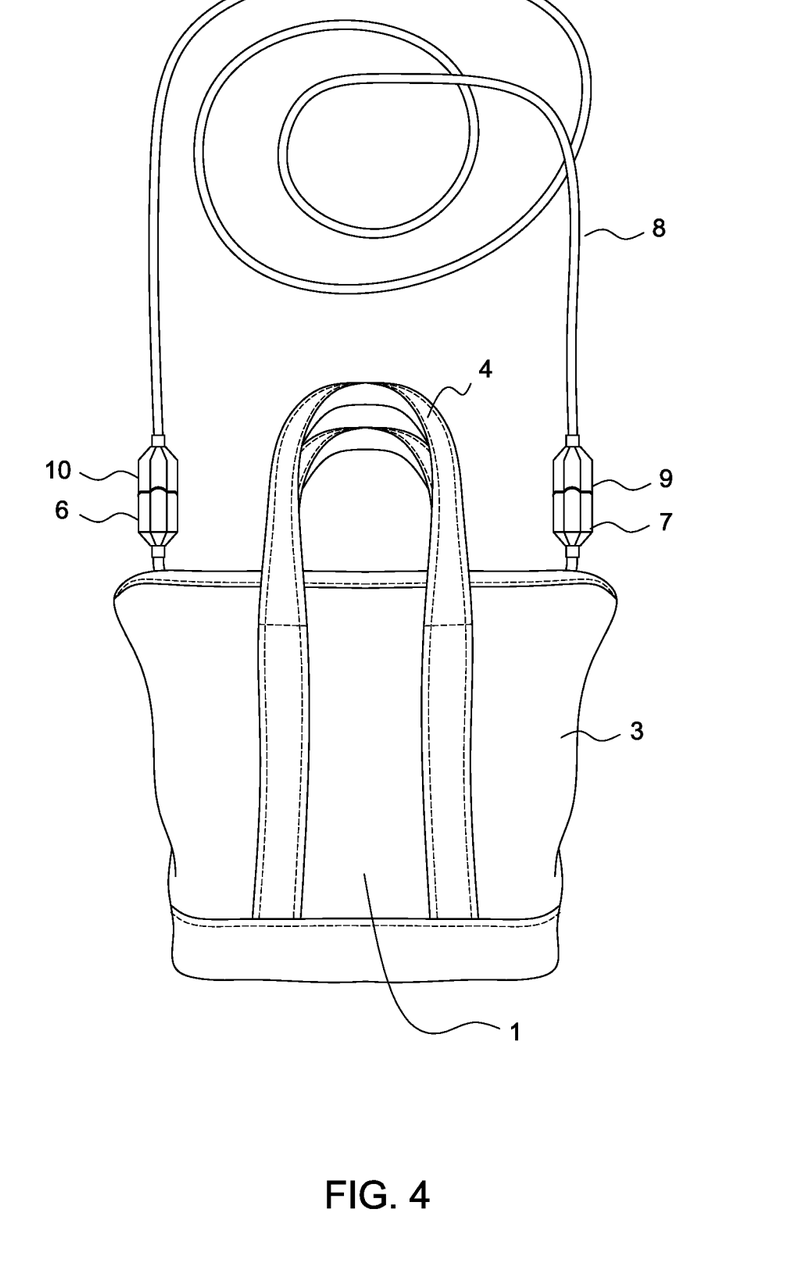
FIG. 4 is another side view of the storage bag of FIG. 1, wherein an extension cord is shown connected to the male and female dummy plugs of the storage bag.

FIG. 4 is a side view of bag 1 in accordance with this example embodiment of the invention, with bag exterior 3 and handle 4. Male dummy plug 6 and female dummy plug 7 are connected to the inside of bag 1. Extension cord 8 is connected to the bag by extension cord male plug 9 plugging into female dummy plug 7, and extension cord female plug 10 plugging with male dummy plug 6.

Figure 5:
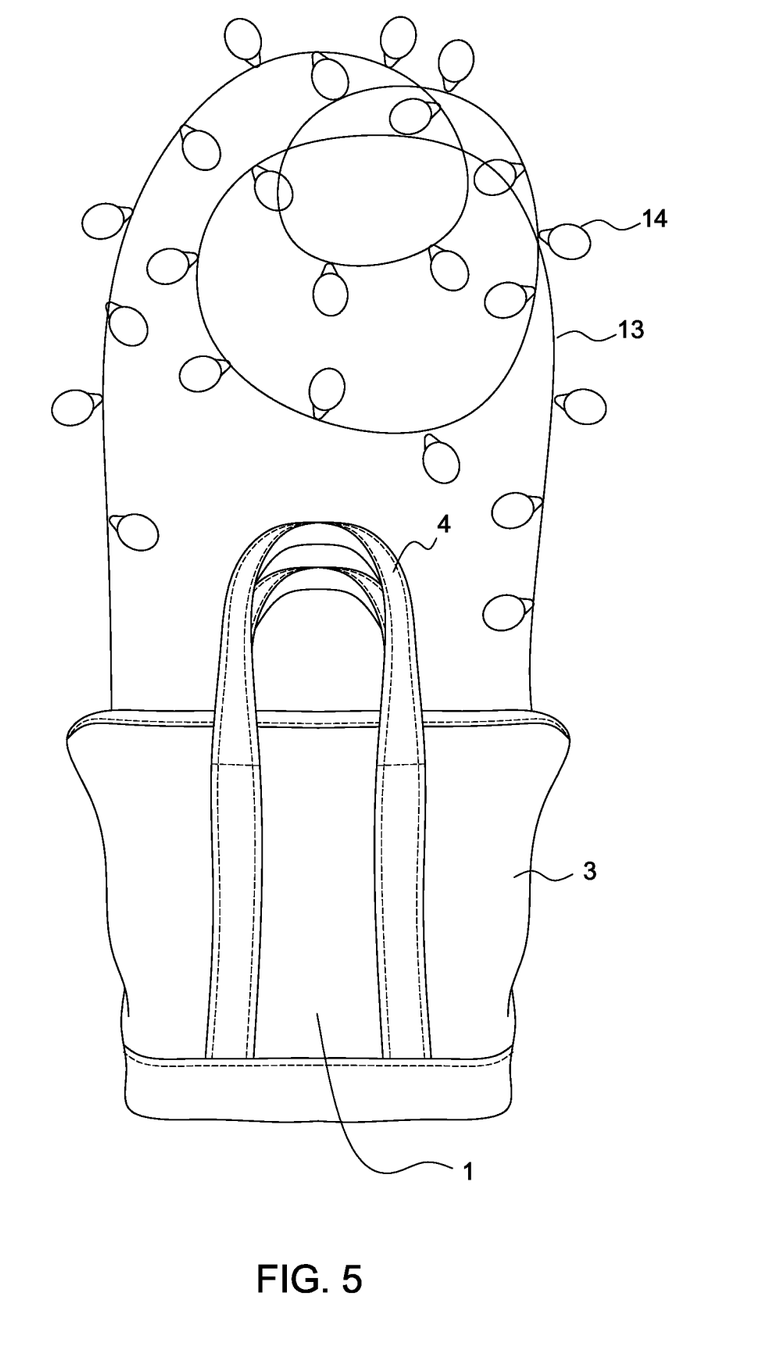
FIG. 5 is yet another side view of the storage bag of FIG. 1, wherein a cord with lights is connected to the male and female dummy plugs in the storage bag.

FIG. 5 is a side view of bag 1 in accordance with this example embodiment of the invention, with bag exterior 3 and handle 4. A cord 13 with lights 14 is plugged into dummy plugs inside the bag.

In another example embodiment, the bag has a dual operation zipper. In this example embodiment, the zippers can be operated to open both ends near the dummy plugs and keep the bag closed in the middle. This would allow either end of the extension cord, or both ends, to be removed from their respective dummy plugs and pulled from the bag, while keeping some portion of the cord secured in the bag.

Figure 2:
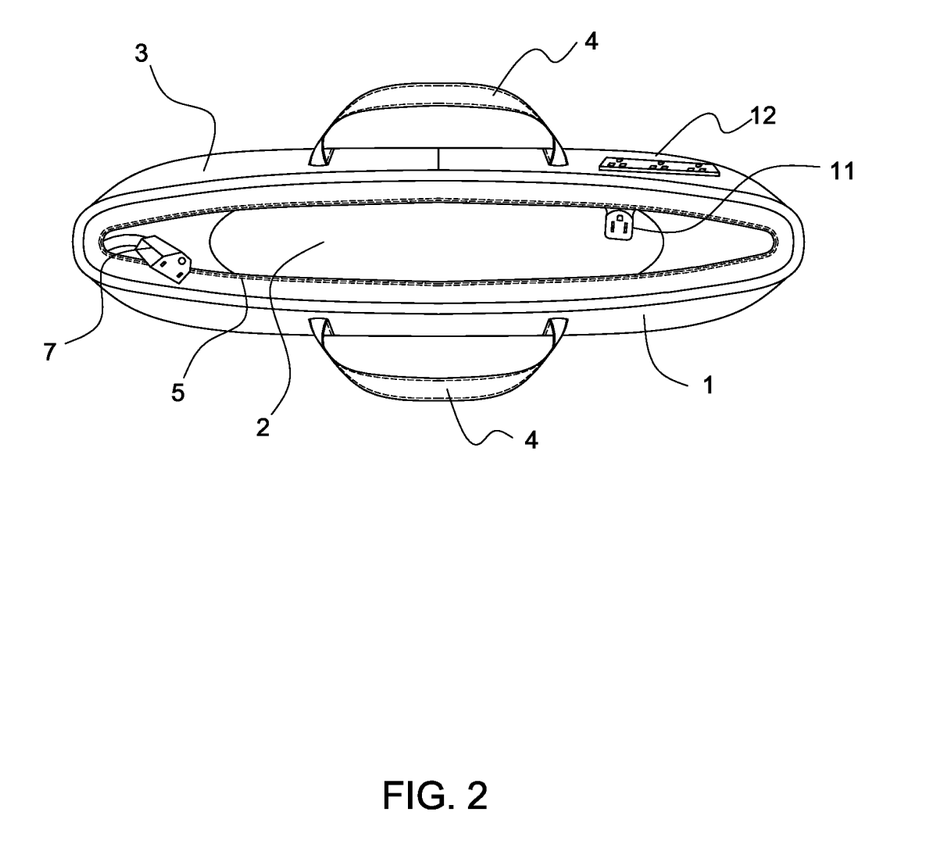
FIG. 2 is a top view of a storage bag for preventing knots, according to another example embodiment of the invention, wherein an active female receptacle is provided on an exterior of the storage bag.
Figure 6:
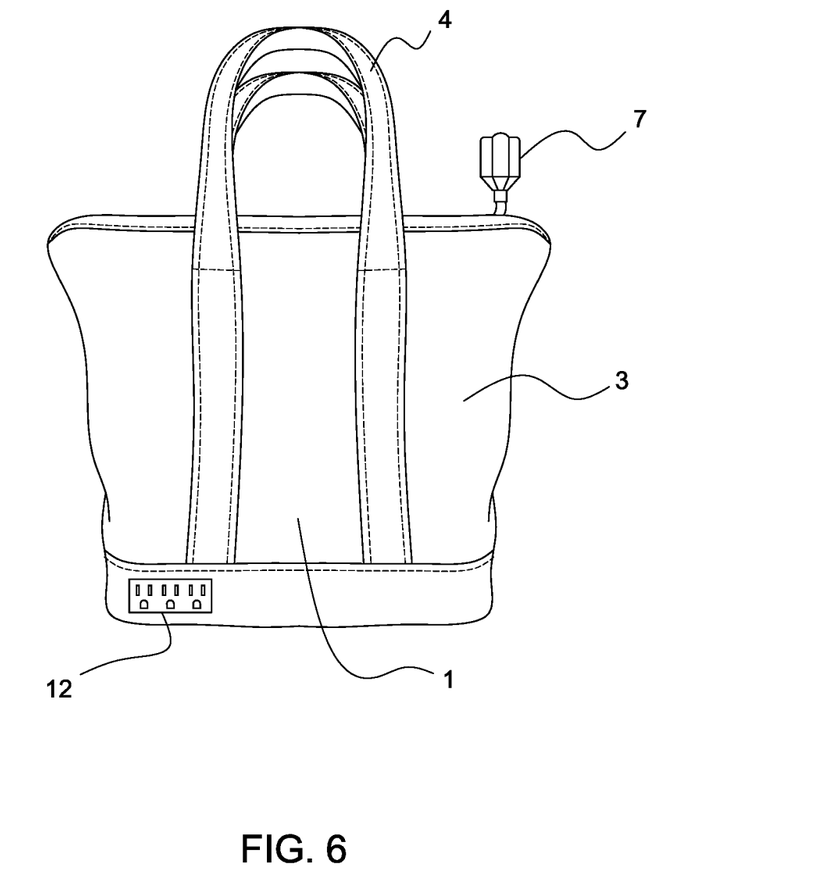
FIG. 6 is a side view of the storage bag of FIG. 2.

In another example embodiment shown in FIGS. 2 and 6, the bag 1 has an active adapter with male plug end 11 for the female end of the extension cord, and one or more female receptacles 12 that are fitted thru the wall of the bag. In this example, the plug 11 for the female end of the extension cord is electrically connected to receptacle 12. Thus, the bag can act like a self-contained power strip, doling out enough wire to plug into an outlet and reach the job site.

FIG. 2 is a top view of the bag 1 in accordance with this example embodiment of the invention. The bag 1 has a bag interior 2 and a bag exterior 3. Bag 1 also has handles 4 and a zipper 5. Bag 1 has a built-in female dummy plug 7. Bag 1 also has an active plug male 11 on the bag interior 2 that connects with active plug female receptacle 12 on the bag exterior 3.

FIG. 6 is a side view of the bag 1 in accordance with this example embodiment of the invention, with bag exterior 3 and handle 4. Female dummy plug 7 is connected to the interior 2 of the bag 1. Active plug female receptacle 12 is connected to the bag exterior 3 and extends to the interior 2 of the bag 1 with an active male plug on the interior 2.

In another embodiment, the dummy plugs are contained within the bag. In this embodiment an unknotted cord can simply be plugged into the male and female plugs and then the cord can be quickly gathered or looped into a bundle that conveniently fits inside the bag.

Now, a method of storing a cord in a bag to prevent knotting of the cord will be described. The initial step of the method comprises starting with a cord outside of the bag and in an unknotted condition. After which, the male and female ends of the cord are inserted into their respective dummy receptacles connected to the inside of the bag. Then, the cord is gathered up with reasonable care, and the gathered-up cord is placed in the bag. To utilize the cord, the user simply reverse this operation and removes the entire cord from the bag while making sure the ends are still connected to their dummy receptacles, and then proceeds to unplug the cord from the dummy receptacle and plug it into an actual electrical receptacle. Alternatively, to utilize the cord, the user unplugs the desired end, plugs it into the device or wall receptacle, and removes cord length from the bag as needed to reach the desired length or destination.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claim(s) in any manner. Rather, the scope of the invention is defined only by the claim(s) and their equivalents, and not, by the preceding description.

The invention claimed is:

1. An electrical cord storage bag for preventing cord knots, comprising:
   a bag body portion, the bag body portion defining an interior compartment configured to store an electrical cord therein;
   a first cord end retention device, the first cord end retention device configured to be coupled to a first end of the electrical cord; and
   a second cord end retention device, the second cord end retention device configured to be coupled to a second end of the electrical cord;
   wherein an attachment of the first and second ends of the electrical cord to the respective first and second cord end retention devices is configured to prevent a formation of knots in the electrical cord being stored in the interior compartment of the electrical cord storage bag; and
   wherein the first cord end retention device is in a form of a female dummy socket, and the first end of the electrical cord comprises a male plug configured to be inserted into the female dummy socket.

2. The electrical cord storage bag according to claim 1, further comprising a closure mechanism for closing the interior compartment of the bag body portion so as to protect the electrical cord during storage and/or transport.

3. The electrical cord storage bag according to claim 2, wherein the closure mechanism is selected from a group consisting of: (i) a zipper, (ii) one or more snaps, (iii) one or more buttons, (iv) a tie, (v) a flap, (vi) a hook and loop fastener device, (vii) a magnetic closure, and (viii) combinations thereof.

4. The electrical cord storage bag according to claim 1, further comprising one or more handles attached to the bag body portion for facilitating the carrying of the electrical cord 2 storage bag by a user thereof.

5. The electrical cord storage bag according to claim 1, wherein the bag body portion is selected from a group consisting of: (i) a soft-sided bag, (ii) a fabric bag, (iii) a canvas bag, (iv) a nylon bag, (v) a leather bag, (vi) a paper bag, (vii) a plastic bag, (viii) a bag with a hard bottom, (ix) a compressible bag, and (x) a rubber bag.

6. The electrical cord storage bag according to claim 1, wherein the second cord end retention device is selected from a group consisting of: (i) a male dummy plug, (ii) an active electrical plug, (iii) a combination male two-prong or three-prong plug, and (iv) combinations thereof.

7. The electrical cord storage bag according to claim 1, wherein the electrical cord that is configured to be stored in the bag body portion is selected from a group consisting of: (i) an electrical extension cord or cable, (ii) electrical wiring of decorative string lights, (iii) a power extender cord or cable, (iv) a drop cord, (v) a power strip, (vi) an electronic cable, (vii) an extension cable, (viii) a phone cable, (ix) a coaxial cable, (x) a speaker cable, (xi) a guitar cable, (xii) a stereo cable, (xiii) an instrument cable, and (xiv) a cable.

8. The electrical cord storage bag according to claim 1, wherein the second cord end retention device is in a form of a male dummy plug, and the second end of the electrical cord comprises a female socket configured to receive the male dummy plug.

9. The electrical cord storage bag according to claim 1, wherein the second end of the electrical cord comprises a female socket; and
   the electrical cord storage bag further comprises an active electrical adapter provided in the bag body portion, the active electrical adapter comprising a male plug end configured to be inserted into the female socket of the electrical cord and one or more female receptacles that are disposed in a wall of the bag body portion, thereby enabling the electrical cord storage bag to operate as a self-contained power strip where a necessary amount of wire is able to be removed from the bag body portion to reach an electrical receptacle.

10. The electrical cord storage bag according to claim 1, further comprising a closure mechanism for closing the interior compartment of the bag body portion so as to protect the electrical cord during storage and/or transport;
   wherein the closure mechanism is a dual operation zipper mechanism comprising one or more zippers configured to open both ends of the bag body portion proximate to respective ones of the first and second cord end retention devices, while keeping the bag body portion closed in the middle part thereof; and
   wherein the dual operation zipper mechanism enables the first end or the second end of the electrical cord to be removed from the respective first cord end retention device or second cord end retention device and pulled from the bag, while keeping a remaining portion of the electrical cord stowed in the interior compartment of the bag body portion.

11. A cord storage container for preventing knots, comprising:
   a container body portion, the container body portion defining an interior compartment configured to store a cord therein;
   a first cord end retention device, the first cord end retention device configured to be coupled to a first end of the cord; and a second cord end retention device, the second cord end retention device configured to be coupled to a second end of the cord;

wherein an attachment of the first and second ends of the cord to the respective first and second cord end retention devices is configured to prevent a formation of knots in the cord being stored in the interior compartment of the cord storage container; and wherein the first cord end retention device is in a form of a female dummy socket, and the first end of the cord comprises a male plug configured to be inserted into the female dummy socket.

12. A method of storing an electrical cord in a bag to prevent knotting of the cord, the method comprising the steps of:

starting with an electrical cord in an unknotted condition;

providing an electrical cord storage bag for preventing cord knots, the electrical cord storage bag including:
   a bag body portion, the bag body portion defining an interior compartment configured to store the electrical cord therein;
   a first cord end retention device, the first cord end retention device configured to be coupled to a first end of the electrical cord; and
   a second cord end retention device, the second cord end retention device configured to be coupled to a second end of the electrical cord;

connecting the first end of the electrical cord with the first cord end retention device of the electrical cord storage bag;

connecting the second end of the electrical cord with the second cord end retention device of the electrical cord storage bag;

gathering up the electrical cord without creating any knots in the electrical cord;

placing the gathered-up electrical cord in the interior compartment of the electrical cord storage bag while the first and second ends of the electrical cord remain attached to the respective first and second cord end retention devices so as to prevent a formation of knots in the electrical cord being stored in the interior compartment of the electrical cord storage bag;

when utilizing the electrical cord, removing the electrical cord from the interior compartment of the electrical cord storage bag while the first and second ends of the electrical cord remain attached to the respective first and second cord end retention devices;

disconnecting the first end of the electrical cord from the first cord end retention device of the electrical cord storage bag; and plugging the first end of the electrical cord into an electrical power receptacle.

13. The method according to claim 12, wherein the first cord end retention device is in a form of a female dummy socket, and the first end of the electrical cord comprises a male plug configured to be inserted into the female dummy socket.

14. The method according to claim 12, wherein the second cord end retention device is in a form of a male dummy plug, and the second end of the electrical cord comprises a female socket configured to receive the male dummy plug.

15. The method according to claim 12, further comprising the steps of:

when utilizing the electrical cord, disconnecting the first end of the electrical cord from the first cord end retention device of the electrical cord storage bag;

plugging the first end of the electrical cord into an electrical power receptacle;

removing a desired length of the electrical cord from the electrical cord storage bag to reach a particular area where electrical power from the electrical cord is needed;

disconnecting the second end of the electrical cord from the second cord end retention device of the electrical cord storage bag; and connecting the second end of the electrical cord to a power cord of a device requiring the electrical power.

* * * * *